J. F. SCHMALZRIED.
SANITARY DRAIN PAN FOR REFRIGERATORS.
APPLICATION FILED JUNE 1, 1911.
1,059,570.
Patented Apr. 22, 1913.
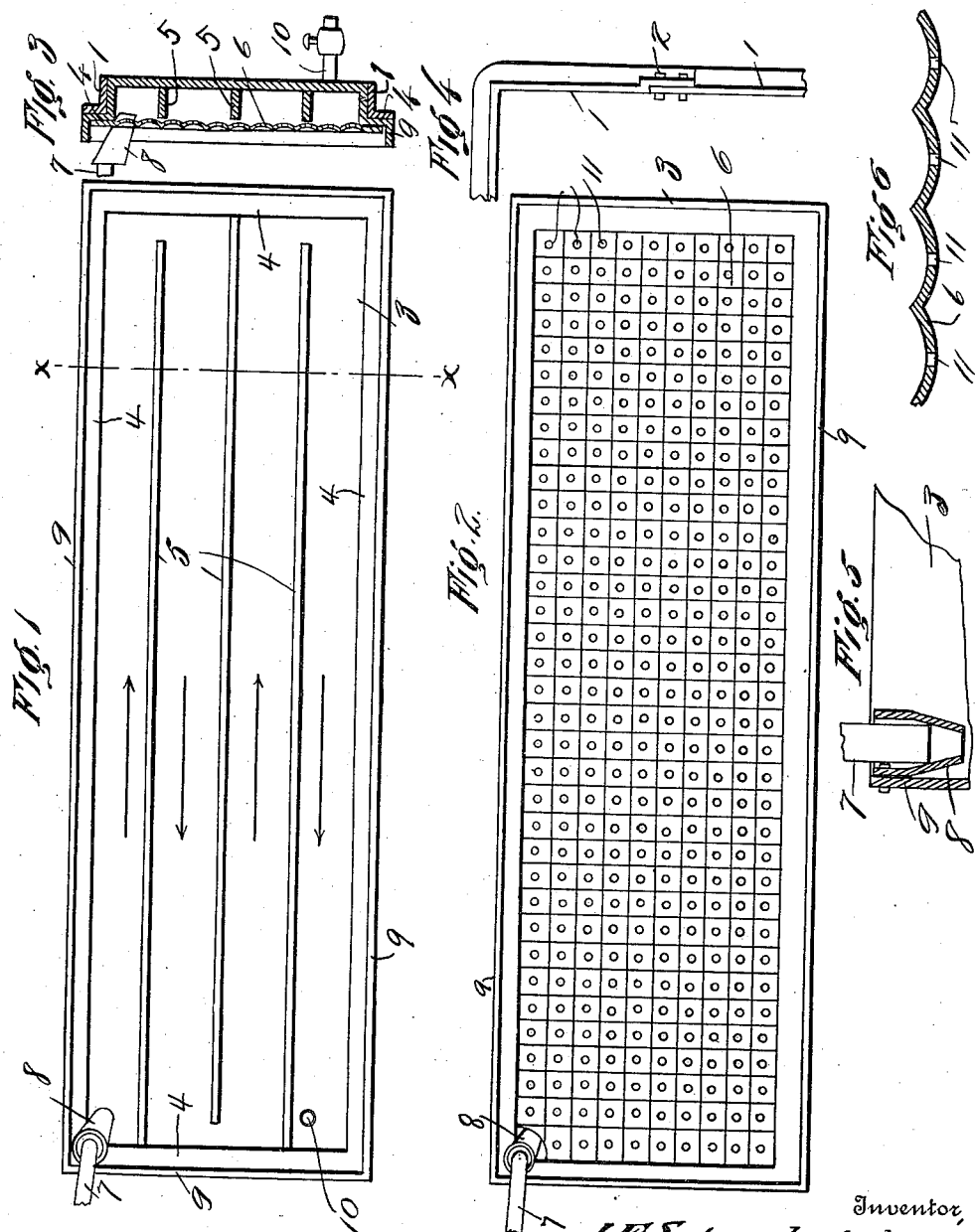
Witnesses:
Inventor,
J. F. Schmalzried.
By A. D. Jackson,
Attorney

UNITED STATES PATENT OFFICE.

JOHN F. SCHMALZRIED, OF FORT WORTH, TEXAS.

SANITARY DRAIN-PAN FOR REFRIGERATORS.

1,059,570.

Specification of Letters Patent.

Patented Apr. 22, 1913.

Application filed June 1, 1911. Serial No. 630,737.

*To all whom it may concern:*

Be it known that I, JOHN F. SCHMALZRIED, a citizen of the United States, residing at Fort Worth, in the county of Tarrant and State of Texas, have invented certain new and useful Improvements in Sanitary Drain-Pans for Refrigerators, of which the following is a specification.

My invention relates to sanitary devices and more particularly to drain pans for sliced meats, and the object is to provide devices for containing sliced meats.

Sliced meats, when stacked up, even in nice porcelain platters, will be soured in a very short while because the juice from the meat will collect about the meat and all the meat which remains in contact with the juice will be soured.

One object of this invention is to drain the meat so that it will be kept free of the juices and another object is to wash the juices away from the drip pan as fast as it falls into the drip pan.

One object is to keep ice boxes and refrigerators clean by preventing all blood and juices from running out on the walls and floors. Such blood and juice will sour and produce gases which will affect other meats or foods and cause them to sour and at the same time raise the temperature.

The improved drip pan will always provide a nice, clean, and fresh place for laying steak and other sliced meats.

Other objects and advantages will be fully explained in the following description and the invention will be more particularly pointed out in the claims.

Reference is had to the accompanying drawings which form a part of this application.

Figure 1 is a plan view of the pan without the meat holder. Fig. 2 is a plan view with the meat holder in place. Fig. 3 is a vertical section along the line *x—x* of Fig. 1. Fig. 4 is an enlarged broken portion of the bottom of the supporting frame. Fig. 5 is a detail sectional view of the connection of a water pipe with the drip pan. Fig. 6 is an enlarged section of the meat holder.

Similar characters of reference are used to indicate the same parts throughout the several views.

A frame is provided which may consist of a single piece of angle iron 1 bent to form the sides and ends of the frame and a portion of the vertical portion of the angle iron being lapped, as shown at 2 and riveted together. A sheet metal pan 3 is provided which has the deepest portion suspended within the frame 1. The pan 3 has ledges 4 resting on the frame 1. The pan 3 should be substantially horizontally disposed so that water will run over the entire surface of the bottom and provision is made for causing the water to run in a serpentine course over the bottom of the pan. This is done by parallel bars or strips 5 which are arranged to let water pass at one end of each bar, the passages being alternately arranged. The meat holder or platter 6 rests on the ledges 4 of the pan. The drip water from melting ice may be run into the pan 1 by a pipe 7. Water from any other source can be supplied to the pan 1 in the same manner.

An open bottom cup or funnel-shaped holder 8 may be riveted to the side or edge 9 of the pan 1. The holder is smaller at the bottom and large at the top so that an easy and quick connection of the pipe 7 may be effected. The pipe 7 rests loosely in the holder and the connection can be quickly made.

The platter 6 is cut away for the entrance of the holder 8. The juices and blood and water escape through a pipe 10 leading from the bottom of the pan. The platter 6 is formed with numerous indentations which are concaved on the upper face. These oval cavities are perforated at the lowest points forming drain holes 11, shown in detail in Fig. 6. The platter will thus have provision for drainage over the entire surface.

The drain pan herein shown will be useful in ice boxes, refrigerators, and other cold storage devices and it will make it possible to keep such devices clean and sanitary. The device is also economical because the water from the melting ice is used a second time for cooling purposes. The drain pan is shallow so that the benefit of the coolness of the water is utilized on the meat in the platter above the pan.

This device will be particularly useful on battleships and other steamers where meat is to be kept for considerable lengths of time. Sliced meats can be kept more than double the length of time in this improved drain pan than with the platters and other devices in use.

Having fully described my invention, what I claim as new and desire to secure by Letters Patent, is,—

1. A sanitary drainage apparatus for sliced meats and the like comprising a frame, a pan hung on said frame and having a ledge in the vertical walls thereof, a platter resting on said ledge and coextensive with the bottom of said pan and having a series of perforated depressions therein, means for causing water to flow into one corner of said pan, means for causing water to flow in a serpentine course over the entire bottom of said pan, said bottom being substantially horizontally disposed whereby the bottom will be constantly covered with water, and means for drawing water and juices out of said pan at the corner diagonally opposite the corner receiving the water.

2. A sanitary draining pan having a frame horizontally disposed, a pan having a flanged ledge in the vertical wall engaging said frame, a platter resting on said ledge inside of the flange thereof and having a series of depressions and a perforation through the lowest point of each depression, bars attached to the bottom of said pan for causing water to run in a serpentine course over the bottom and under said platter, said bottom being substantially horizontal, whereby it will be constantly covered with water, means for causing the water to run in said pan at the commencement of said serpentine course, and means for drawing the water and juices out of said pan at the end of said course.

In testimony whereof, I set my hand in the presence of two witnesses, this 19th day of May, 1911.

JOHN F. SCHMALZRIED.

Witnesses:
A. L. JACKSON,
J. W. STITT.

Copies of this patent may be obtained for five cents each, by addressing the "Commissioner of Patents. Washington, D. C."